United States Patent
Benz et al.

(10) Patent No.: US 6,875,416 B1
(45) Date of Patent: Apr. 5, 2005

(54) METHOD FOR PRODUCING LITHIUM-TRANSITION METAL MIXTURES

(75) Inventors: Mathias Benz, Goslar (DE); Wolfgang Kummer, Goslar (DE); Evelyn Pross, Albbruck (DE); Josef Schmoll, Goslar (DE); Wolfgang Schweda, Rhüden (DE); Daniel Duff, Leverkusen (DE); Ricarda Leiberich, Langen (DE); Christoph Schild, Leverkusen (DE); Ulrich Krynitz, Goslar (DE); Juliane Meese-Marktscheffel, Goslar (DE); Viktor Stoller, Bad Harzburg (DE)

(73) Assignee: H. C. Starck GmbH & Co, Goslar (DE)

( * ) Notice: Subject to any disclaimer, the term of this patent is extended or adjusted under 35 U.S.C. 154(b) by 0 days.

(21) Appl. No.: 09/601,946
(22) PCT Filed: Aug. 13, 1998
(86) PCT No.: PCT/EP98/05150
§ 371 (c)(1), (2), (4) Date: Sep. 21, 2000
(87) PCT Pub. No.: WO99/40029
PCT Pub. Date: Aug. 12, 1999

(30) Foreign Application Priority Data

Feb. 9, 1998 (EP) .................... PCT/EP 98/00697

(51) Int. Cl.$^7$ .......... C01D 1/02; C01G 37/02; C01G 45/02; C01F 7/04
(52) U.S. Cl. ........ 423/594.15; 252/182.1; 423/593.1; 423/594.2; 423/594.4; 423/594.6; 423/596; 423/599; 423/600
(58) Field of Search .............. 423/594, 593, 423/596, 599, 179.5; 252/182.1

(56) References Cited

U.S. PATENT DOCUMENTS 4,567,031 A * 1/1986 Riley .................. 423/593
4,668,595 A  5/1987 Yoshino et al. ............. 429/194

(Continued)

FOREIGN PATENT DOCUMENTS

CN  1102909 A  5/1995
EP  0643430 A  3/1995  ............ H01M/4/52

(Continued)

OTHER PUBLICATIONS

Journal of Power Sources 54 (month unavailable) 1995, pp. 209–223, Shuji Yamada et al, "Synthesis and properties of LiNiO$_2$ as cathode material for secondary batteries".
Journal of Power Sources 54 (month unavailable) 1995, pp. 329–333, R.V. Moshtev et al, "The LiNiO$_2$ solid solution as a cathode material for rechargeable lithium batteries".

(Continued)

Primary Examiner—Stanley S. Silverman
Assistant Examiner—Jonas N. Stickland
(74) Attorney, Agent, or Firm—Godfried R. Akorli; Diderico van Eyl

(57) ABSTRACT

The invention relates to a method for producing lithium-transition metal mixtures of general formula Li$_x$(M$^1_y$M$^2_{1-y}$)$_n$O$_{nz}$, wherein M$^1$ represents nickel, cobalt or manganese, M$^2$ represents chromium, cobalt, iron, manganese, molybdenum or aluminium, and is different from M$^1$, n is 2 if M$^1$ represents manganese and is 1 otherwise, x is comprised between 0.9 and 1.2, y is comprised between 0.5 and 1.0 and z is comprised between 1.9 and 2.1. According to the inventive method, an intimate mixture composed of transition metal compounds containing oxygen and of a lithium compound containing oxygen is calcinated, said mixture being obtained by processing a solid powder transition metal compound with a solution of said lithium compound, and then drying. At least the M$^1$ compound is used in powder form having a specific surface of at least 20 m$^2$/g (BET) and calcination is carried out in a fluidised bed.

9 Claims, 1 Drawing Sheet

U.S. PATENT DOCUMENTS

| | | | |
|---|---|---|---|
| 4,770,960 A | | 9/1988 | Nagaura et al. ............ 429/194 |
| 4,980,080 A | * | 12/1990 | Lecerf et al. ............ 252/182.1 |
| 5,180,574 A | * | 1/1993 | Von Sacken ................ 423/594 |
| 5,264,201 A | | 11/1993 | Dahn et al. ................ 423/594 |
| 5,391,265 A | | 2/1995 | Krynitz et al. ............... 204/96 |
| RE34,991 E | | 7/1995 | Yoshino et al. ............ 429/194 |
| 5,591,548 A | | 1/1997 | Mao .......................... 429/218 |
| 5,629,110 A | | 5/1997 | Kobayashi et al. ......... 429/223 |
| 5,702,679 A | * | 12/1997 | Sheargold et al. .......... 423/599 |
| 5,720,932 A | | 2/1998 | Amine et al. ............... 423/594 |
| 5,728,367 A | * | 3/1998 | Mao .......................... 423/593 |

FOREIGN PATENT DOCUMENTS

| | | | | |
|---|---|---|---|---|
| EP | | 0643430 A1 * | 3/1995 | ............ H01M/4/52 |
| EP | | 0806397 A | 11/1997 | ............ C01G/53/00 |
| EP | | 0806397 A1 * | 11/1997 | ............ C01G/53/00 |
| FR | | 2704216 A1 * | 10/1994 | ............ C01D/15/02 |
| FR | | WO9425398 | * 11/1994 | ............ C01G/51/00 |
| JP | | 7-105950 | 4/1995 | |
| JP | | 10-152327 | 6/1998 | |
| WO | | WO 94/25398 | 11/1994 | ............ C01G/51/00 |

OTHER PUBLICATIONS

Journal of Power Sources 54 (month unavailable) 1995, pp. 522–524, T. Nohma et al, "Electrochemical characteristics of $LiNiO_2$ and $LiCoO_2$ as a positive material for lithium secondary batteries".

* cited by examiner

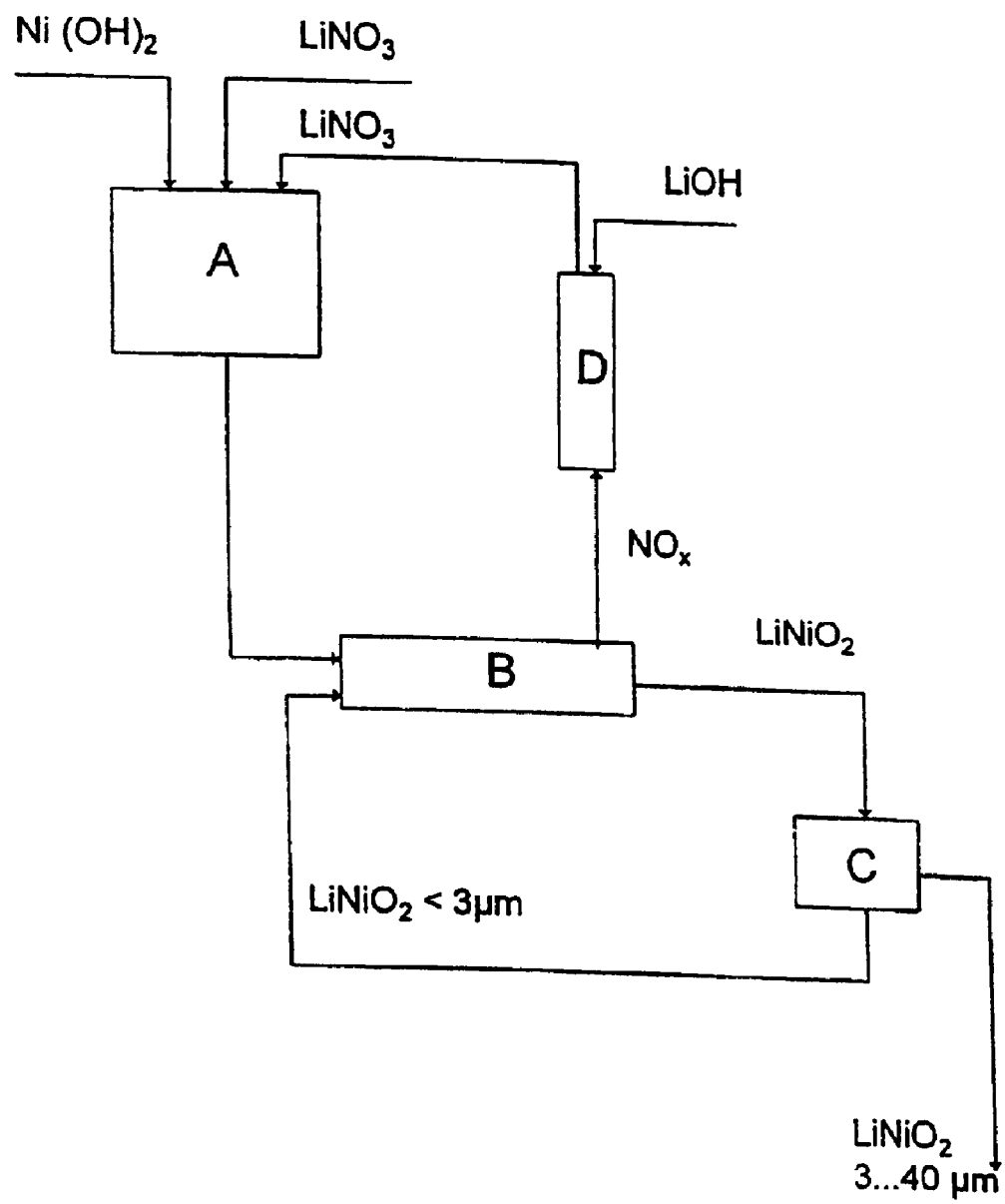

METHOD FOR PRODUCING LITHIUM-TRANSITION METAL MIXTURES

The present invention relates to a process for preparing lithium transition metallates of the general formula $$Li_x(M^1{}_yM^2{}_{1-y})_nO_{nz},$$

wherein $M^1$ represents nickel, cobalt or manganese, $M^2$ represents a transition metal which is different from $M^1$ and is chromium, cobalt, iron, manganese, molybdenum and/or aluminium, n is 2 if $M^1$ is manganese, and n is 1 if $M^1$ is nickel or cobalt, wherein x has a value from 0.9 to 1.2, y has a value between 0.5 and 1 and z has a value between 1.9 and 2.1.

These types of lithium transition metallates are used as electrode materials, in particular as cathode materials for non-aqueous lithium storage battery systems, so-called lithium ion batteries.

A number of proposals have already been made relating to methods of preparation of these types of lithium transition metallates, but these are mostly unsuitable for large-scale production or lead to products which have imperfect electrochemical properties.

The use of $LiCoO_2$ has recently gained acceptance, but this is extremely expensive due to the limited availability, and thus high price, of cobalt and is therefore not suitable for mass production (e.g. to provide the power for electrically operated vehicles). Therefore intensive efforts have already been made to replace all or some of the $LiCoO_2$ with, for example, $LiNiO_2$ and/or $LiMn_2O_4$ as a cathode material.

Synthesis of the corresponding cobalt compound $LiCoO_2$ is generally regarded as a non-critical procedure. Due to the thermal stability of $LiCoO_2$, it is even possible, with this system, to react cobalt carbonate and lithium carbonate, as reaction components, directly at relatively high temperatures without troublesome concentrations of carbonate being left in the final product.

The transfer of this method to $LiNiO_2$ has been possible only at temperatures of 800° C. to 900° C. These high calcination temperatures, however, lead to partly decomposed lithium nickelates with relatively low storage capacities and/or unsatisfactory resistance to cyclic operation.

For this reason, carbonate-free mixtures are proposed for preparing $LiNiO_2$, in which, in most cases, β-nickel hydroxide is favoured as the nickel component, such as is described, for example in U.S. Pat. No. 5,591,548, EP 0 701 293, J. Power Sources 54 (95) 209–213, 54 (95) 329–333 and 54 (95) 522–524. Moreover, the use of nickel oxide was also recommended in JP-A 7 105 950 and that of oxynickel hydroxide NiOOH in DE-A 196 16 861.

According to U.S. Pat. No. 4,567,031, the intimate mixture is prepared by co-precipitation of soluble lithium and transition metal salts from solution, drying the solution and calcining. Relatively finely divided crystals of the lithium transition metallate are obtained in this way at comparatively low calcining temperatures and within comparatively short times. The allocation of lithium and transition metal ions to particular layers in the crystal lattice, however, is greatly distorted so that, to a large extent, nickel ions occupy lithium layer lattice positions and vice versa. These types of crystals have unsatisfactory properties with regard to their use as electrodes in rechargeable batteries. Other processes (EP-A 205 856, EP-A 243 926, EP-A 345 707) start with solid, finely divided carbonates, oxides, peroxides or hydroxides of the initial metals. The intimate mixture is prepared by joint milling of the starting metals. The formation of lithium transition metallates takes place by solid diffusion during calcination. Solid diffusion requires comparatively high temperatures and comparatively long calcining times and does not generally lead to phase-pure lithium metallates with outstanding electronic properties. Extensive observations appear to prove that, in the case of the nickel system, decomposition of $LiNiO_2$ with the production of $Li_2O$ and NiO is initiated during prolonged thermal treatment at temperatures above about 700° C.

Therefore, in order to intensify the intimate mixing procedure, it has already been proposed, according to EP-A 468 942, to start the preparation of lithium nickelate with powdered nickel oxide or hydroxide, suspending the powder in a saturated lithium hydroxide solution and extracting the water from the suspension by spray drying. This should lead to a reduction in the calcining time and calcining temperature. Due to the relatively low solubility of lithium hydroxide in water, however, the homogeneity of this mixture is limited.

U.S. Pat. No. 5,591,548 proposes milling a powdered oxygen-containing transition metal compound with lithium nitrate and then calcining under an inert gas. The advantage of this process is the low melting point of lithium nitrate, 264° C., which means that intimate mixing takes place after heating to, for example, 300° C. in the form of a suspension of transition metal particles in molten lithium nitrate, which favours reaction with the solid.

The disadvantage of this process is that, during calcination, the gases released ($H_2O$, $NO_x$, $O_2$) do not escape, or escape only very slowly, from the viscous molten suspension so that the intimate contact required for the solid reaction and diffusion is hindered and on the other hand only a few suspended particles are present due to concentration inhomogeneities in the geometric spacing. Therefore, interruptions in the calcining process and intermediate milling to homogenise the reaction material are required.

Accordingly, it would be desirable to perform calcination in a moving bed, which would have a beneficial effect on release of the gases produced during reaction, product homogeneity and the residence time required. However, the use of a moving bed conflicts with the use of low-melting lithium compounds such as lithium nitrate or lithium hydroxide because these would then form the expected viscous molten suspension with the transition metal compound and caking would occur at the limiting walls of the moving bed and the product would become agglomerated due to the production of this suspension during the course of reaction.

It has now been found that agglomeration of the product and caking at the limiting walls of the moving bed can be avoided if the transition metal compound is used in the form of a powder with a specific surface area of at least 10 m²/g (BET), wherein, before calcination, the transition metal compound with a large specific surface area is impregnated with the solution of an oxygen-containing lithium compound and the solvent is removed by drying.

As a result of the high specific surface area, the transition metal compound powder is able to absorb the lithium compound in such a way that a continuous phase cannot be produced on heating to a temperature above the melting point of the lithium compound and caking of the transition metal compound powder which is coated with the lithium compound, with the wall of the reactor as well as of the powder particles with each other, is very largely suppressed.

Accordingly, the invention provides a process for preparing lithium transition metallates of the general formula $$Li_x(M^1{}_yM^2{}_{1-y})_nO_{nz},$$

wherein
M¹ represents nickel, cobalt or manganese,
M² represents chromium, cobalt, iron, manganese, molybdenum or aluminium and is not identical to M¹,
n is 2 if M¹ is manganese, otherwise 1,
x is a number between 0.9 and 1.2,
y is a number between 0.5 and 1.0 and
z is a number between 1.9 and 2.1,
by calcining an intimate mixture of oxygen-containing transition metal compounds and an oxygen-containing lithium compound, which has been obtained by treating a solid powdered transition metal compound with a solution of the lithium compound and drying, characterised in that at least the M¹ compound is used in the form of a powder with a specific surface area of at least 10 m²/g (BET) and calcination is performed in a moving bed.

The M¹ compound preferably has a specific surface area of at least 25 m²/g, particularly preferably at least 40 m²/g.

Hydroxides are used as preferred M¹ transition metal compounds. Nickel hydroxide is particularly preferred. β-nickel hydroxide with a specific surface area of 60 to 80 m²/g is particularly preferably used, especially if it has been obtained as described in U.S. Pat. No. 5,391,265.

If y is less than 1, at least some of the M² transition metal compound is preferably used in the form of a mixed hydroxide of the formula $(M^1{}_yM^2{}_{1-y})(OH)_2$. The value of y should preferably be greater than 0.8, particularly preferably greater than 0.9.

Lithium hydroxide and/or lithium nitrate may be used as oxygen-containing lithium compounds. These are preferably mixed with the transition metal compound in aqueous solution and then dried and granulated. Lithium nitrate is used as the preferred oxygen-containing lithium compound. The aqueous solution of the lithium compound is preferably used in a concentrated form, in the case of lithium nitrate as a more than 35% strength aqueous solution.

According to one variant of the process according to the invention, at least some of the M² transition metal compound may be used as a solution constituent in the solution of the lithium compound for impregnating the M¹ transition metal compound.

To prepare the intimate mixture, the solid, powdered transition metal compound is mixed with the solution of the lithium compound, with stirring, and then the solvent, in particular water, is removed by drying, e.g. by spray-drying, fluidised bed spray granulation or mixer agglomeration. A spray dried material with an agglomerate size of less than 100 μm is preferred.

Subsequent calcination in a moving bed may be performed in a rotary kiln, a fluidised bed or a fall-shaft reactor (downer). The use of a rotary kiln is particularly preferred. In this case, the granules are introduced continuously or batchwise into a preferably electrically heated rotary kiln and treated over a residence time of 0.5 to 10 hours, preferably 1 to 5 hours, at a temperature of 500° C. to 800° C., preferably 550° C. to 650° C., particularly preferably 580° C. to 620° C.

When heating the intimate mixture to the calcination temperature, the temperature range from below the melting point of the lithium compound up to the calcination temperature should be traversed as rapidly as possible. Accordingly, the intimate mixture should be introduced into a rotary kiln which has already been preheated to the calcination temperature or into a moving bed which has already been preheated to the calcination temperature.

If lithium nitrate is used as the oxygen-containing lithium compound, the intimate mixture can be preheated to a temperature of up to 200° C., preferably 150° C. to 180° C. If lithium hydroxide is used, preheating may take place up to a temperature of 350° C.

Calcination may be performed in an atmosphere which contains up to 50% oxygen, for example air. Calcination is preferably performed, for at least two thirds of the calcination time, under a substantially oxygen-free inert gas, for example argon, with an oxygen content of less than 5%, in particular less than 3%. In this case, the mixture is calcined under an oxygen-containing gas for the remainder of the calcination time. If the moving bed is operated in a batch process, the atmosphere can be exchanged for an oxygen-containing atmosphere after passage of at least two thirds of the calcination time. If a continuously operated rotary kiln is used, an oxygen-containing atmosphere or oxygen may be introduced, preferably in the last third of the kiln, using a lance.

According to the invention, it is also possible to perform post-calcination under an oxygen-containing atmosphere in a separate moving bed.

In the interests of ensuring a narrow distribution of residence times during calcination, batch operation per se is preferred. However, it is also possible to achieve a sufficiently narrow range of residence times with a half-width of less than one quarter of the average residence time in a continuously operated rotary kiln by inserting appropriate baffles with a tapering cross-section in the rotating tube.

Following calcination, the powdered lithium transition metallate emerging from the moving bed is cooled to room temperature (less than 100° C.) and subjected to gentle milling. Suitable milling devices are, for example, those which use the shear effect of a high speed gas profile, when crushing is achieved by particle-particle impact, such as fluidised bed counterstream milling or microfluidised milling. Milling is preferably performed (after removal of the fine fraction) down to an average particle size of 15 to 25 μm diameter. According to a particularly preferred embodiment of the invention, the fine fraction from milling is either recycled to the moving bed or mixed with the powdered, oxygen-containing transition metal compound and then treated together with the solution of oxygen-containing lithium compound and dried, i.e. impregnated.

Lithium nitrate is particularly preferably used as the oxygen-containing lithium compound. The $NO_x$ gas released during calcination in this case is preferably absorbed in an aqueous lithium hydroxide solution and the lithium nitrate solution produced is used to impregnate the powdered transition metal compounds.

The FIGURE is a schematic diagram of a preferred embodiment of the present invention of producing lithium nickelate. The pre-mix production unit A consists of a stirred container, in which a 40% strength aqueous lithium nitrate solution is initially placed, into which is stirred the powdered β-nickel hydroxide with an average particle size of 10 μm and a specific surface area of 65 m²/g. The slurry obtained is dried by spray drying and introduced into rotary kiln B as granules with an average particle diameter of about 100 μm. The contents of the kiln are held at sinter temperature under an inert gas for preferably 1 to 3 hours. Then (with batch operation), the argon atmosphere can be replaced by an atmosphere containing 20 to 50% oxygen. Then the rotary kiln is cooled and the lithium nickelate obtained is milled in a fluidised bed counterstream mill C to a particle diameter of less than 40 μm and the fine fraction with particle sizes of less than 3 μm are separated by air classification or in a cyclone and collected for recycling to kiln B. The $NO_x$-containing kiln atmosphere is scrubbed with aqueous lithium hydroxide solution in scrubber D and the lithium nitrate obtained is recovered for the production of another premix.

EXAMPLES

Example 1

A highly porous nickel hydroxide with a specific surface area of about 65 $m^2/g$ BET is stirred into an approximately 40% strength aqueous solution of lithium nitrate. The molar ratio of $LiNO_3$ to $Ni(OH)_2$ is 1.03. The suspension is dried in a spray drying tower. The dried power with an average particle size of about 60 μm is mixed with 5 wt. % of lithium nickelate with a particle size of <5 μm.

500 g of the powder mixture are placed in the hot zone of a laboratory rotary kiln heated to 620° C., through which flows a stream of nitrogen at a speed of 84 m/h. The rotary kiln has an internal diameter of 55 mm and is rotated at 1/4 rpm.

After one hour, the rotary kiln is cooled to less than 100° C. and samples are taken from the kiln.

X-ray diffraction analysis gives the following peak ratios:

| | |
|---|---|
| $I_{104}/I_{003}$ ($LiNiO_2$) | 0.76 |
| $I_{111}(Li_2O)/I_{101}(LiNiO_2)$ | 0.038 |
| Half-width 003 reflection | 0.17 |
| Half-width 104 reflection | 0.19 |

Example 2

Example 1 is repeated with the difference that the rotary kiln is held at 600° C. and cooling takes place after two hours.

Samples taken after cooling gave the following values:

| | |
|---|---|
| $I_{104}/I_{003}$ ($LiNiO_2$) | 1.1 |
| $I_{111}(Li_2O)/I_{101}(LiNiO_2)$ | 0.1 |
| Half-width 003 reflection | 0.27 |
| Half-width 104 reflection | 0.25 |

The majority of the product is post-calcined under air for 16 hours at 620° C. in the rotary kiln. The following values were then obtained from X-ray diffraction analysis:

| | |
|---|---|
| $I_{104}/I_{003}$ ($LiNiO_2$) | 0.59 |
| $I_{111}(Li_2O)/I_{101}(LiNiO_2)$ | 0.003 |
| $I_{002}(Li_2CO_3)/I_{101}(LiNiO_2)$ | 0.009 |
| Half-width 003 reflection | 0.1 |
| Half-width 004 reflection | 0.13 |

Example 3

Example 2 is repeated, wherein the mixture is initially calcined for 2 hours at 640° C. under nitrogen and then for 30 minutes at 640° C. under air.

The following values were obtained from X-ray diffraction analysis:

| | |
|---|---|
| $I_{104}/I_{003}$ ($LiNiO_2$) | 0.76 |
| $I_{111}(Li_2O)/I_{101}(LiNiO_2)$ | 0.037 |
| $I_{002}(Li_2CO_3)/I_{101}(LiNiO_2)$ | 0.017 |
| Half-width 003 reflection | 0.17 |
| Half-width 004 reflection | 0.19 |

What is claimed is:

1. A process for preparing lithium transition metallates of the general formula $$Li_x(M^1_y M^2_{1-y})_n O_{nz},$$

wherein

M$^1$ represents nickel, cobalt or manganese,

M$^2$ represents chromium, cobalt, iron, manganese, molybdenum or aluminium and is not identical to M$^1$, n is 2 if M$^1$ is manganese, otherwise 1, x is a number between 0.9 and 1.2, y is a number between 0.5 and 1.0 and z is a number between 1.9 and 2.1, by calcining an intimate mixture of oxygen-containing transition metal compounds and an oxygen-containing lithium compound, which has been obtained by treating a solid powdered transition metal compound with a solution of the lithium compound and drying, wherein at least the M$^1$ compound is used in the form of a powder with a specific surface area of at least 10 $m^2/g$ (BET) and calcination is performed in a moving bed.

2. A process according to claim 1, wherein the transition metallate is milled and sieved after calcination and the finer fraction from sieving is recycled to the moving bed.

3. A process according to claim 1 wherein a mixed transition metal compound which contains at least some of the M$^2$ compound is used as the M$^1$ compound.

4. A process according to claim 1 wherein the solution of lithium compound contains at least some of the M$^2$ compound.

5. A process according to claim 1 wherein calcination is performed in a rotary kiln, in a fluidised bed or in a fall-shaft reactor (downer).

6. A process according to claim 1 wherein following calcination, milling is performed and, after milling, further calcination is performed in an oxygen-containing atmosphere.

7. A process according to claim 1 wherein $LiNO_3$ is used as the lithium compound and $Ni(OH)_2$ is used as the M$^1$ transition metal compound.

8. A process according to claim 7, wherein $NO_2$ released during calcination is recovered as nitric acid and is reacted with LiOH to give $LiNO_3$ which is used as the lithium compound.

9. A process according to claim 1 wherein the transition metal compound treated with the solution of a lithium compound is dried by spray drying or mixer granulation.

* * * * *